United States Patent [19]

Greiner et al.

[11] 4,315,946

[45] Feb. 16, 1982

[54] MODIFIED VEGETABLE PROTEIN ISOLATES

[75] Inventors: Steven P. Greiner, Waukegan; Wayne E. Marshall, Spring Grove; Linda G. Sitterly, Prospect Heights, all of Ill.

[73] Assignee: Kraft, Inc., Glenview, Ill.

[21] Appl. No.: 121,270

[22] Filed: Feb. 13, 1980

[51] Int. Cl.$^3$ .................................................. A23J 3/00
[52] U.S. Cl. ............................................... 426/46; 426/52; 426/656
[58] Field of Search ........................... 426/46, 52, 656; 435/69

[56] References Cited

U.S. PATENT DOCUMENTS

| | | | |
|---|---|---|---|
| 3,364,034 | 1/1968 | Hoersch et al. | 426/46 X |
| 3,650,768 | 3/1972 | Roberts | 426/36 X |
| 3,674,508 | 7/1972 | Kasik et al. | 426/46 |
| 3,810,997 | 5/1974 | Chien | 426/46 |
| 3,830,942 | 8/1974 | Hawley | 426/46 |
| 3,843,802 | 10/1974 | Puski | 426/46 |

*Primary Examiner*—Robert A. Yoncoskie
*Attorney, Agent, or Firm*—Fitch, Even, Tabin, Flannery & Welsh

[57] ABSTRACT

Method for modifying vegetable protein isolate to provide cheese-compatible flavor and improved textural properties.

6 Claims, 2 Drawing Figures

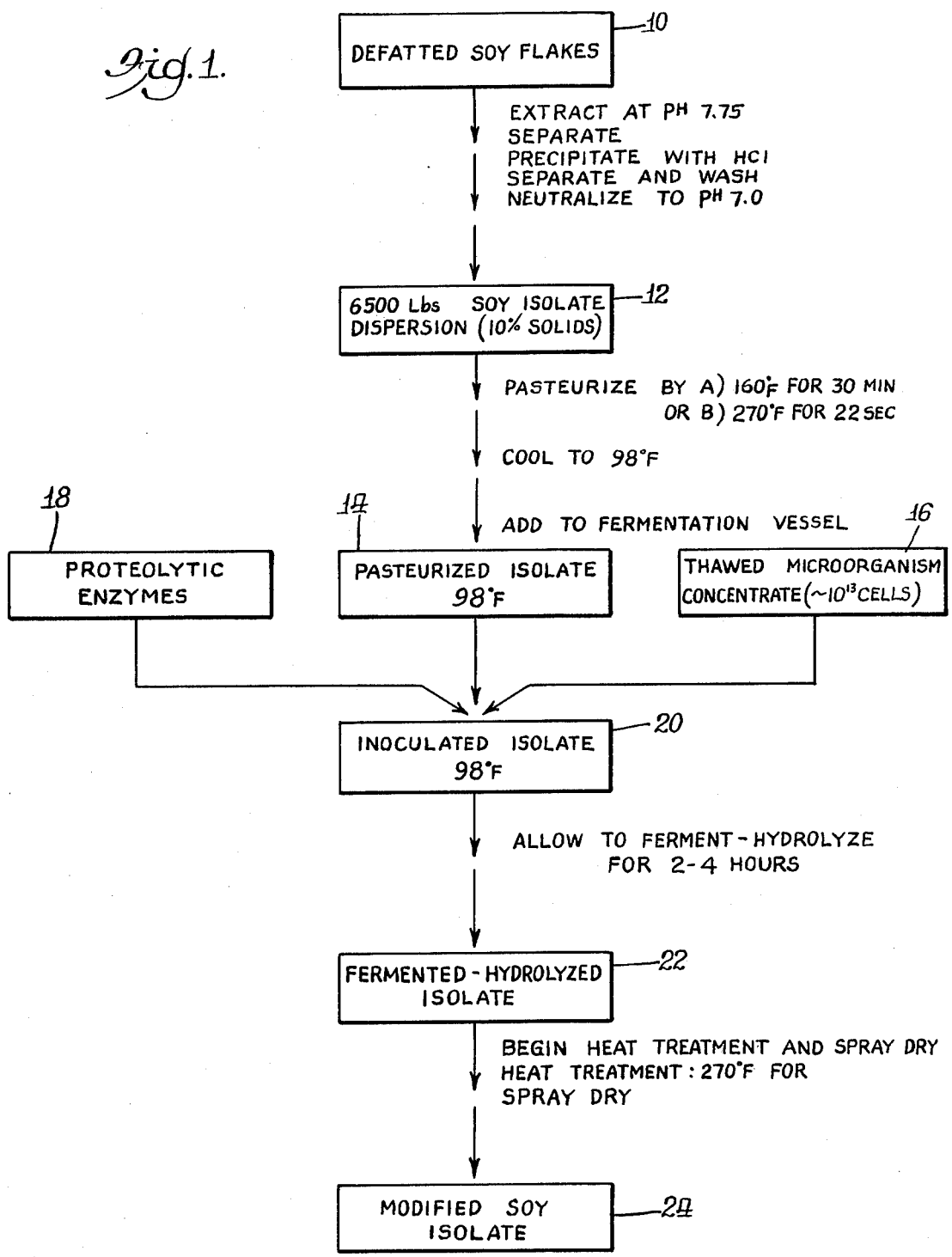

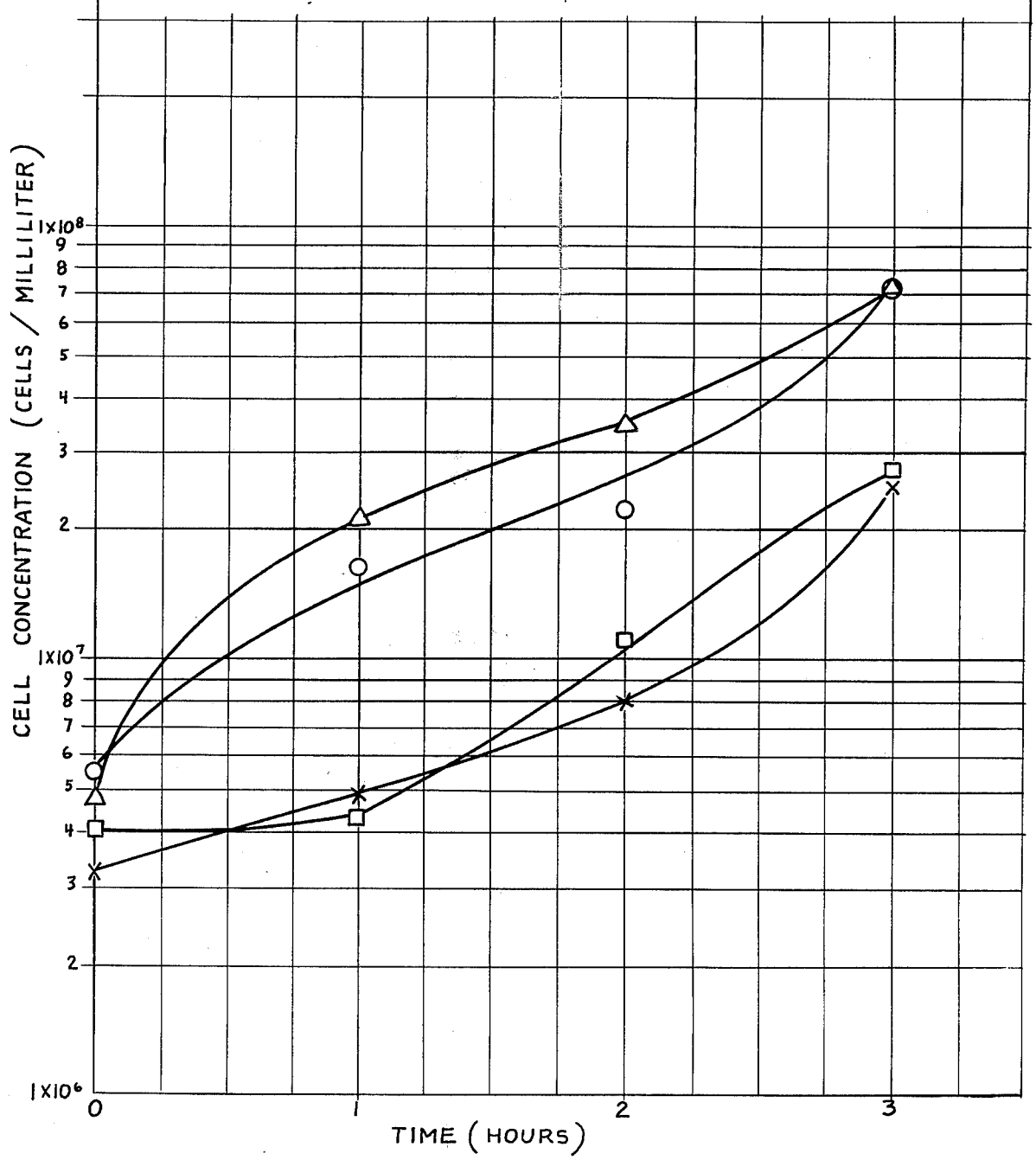

MODIFIED VEGETABLE PROTEIN ISOLATES

The present invention is directed to vegetable protein products, and more particularly, is directed to bland, modified vegetable protein products having fermented, cheese compatible flavors, and to methods for manufacturing such modified vegetable protein products.

Protein derived from vegetable seeds and other vegetable components, such as soy beans, sesame seeds, cotton-seeds, alfalfa or other protein-containing green plants, is a potentially valuable source of protein for human consumption. However, while considerable progress has been made in the utilization of vegetable proteins, such proteins have found limited use in imitation dairy products such as imitation cheese and cheese-compatible products due to unpalatable taste or undesirable physical (e.g., textural) properties of the vegetable protein. In this connection, imitation process cheeses are conventionally prepared from a vegetable oil such as coconut oil, a dairy protein source such as sodium and calcium caseinates, and minor amounts of other imitation process cheese components such as emulsifiers, stabilizing salts and flavor ingredients. It would be desirable to substitute a vegetable protein source for at least a portion of the dairy protein components, but the disadvantageous properties of conventional vegetable proteins have presented difficulties in this regard. For example, the characteristic taste associated with soy beans is generally described as being "beany" and the taste is considered essentially unpalatable to humans. Further, soy protein may impart an undesirably mealy or spongy texture to imitation cheese products such as imitation process cheese. Consequently, vegetable protein sources such as soy beans have had limited use in the manufacture of imitation cheese-compatible compositions such as imitation process cheese.

Numerous methods have been proposed for treating vegetable protein materials so as to provide the vegetable protein in a more desirable form for human use. For example, U.S. Pat. No. 3,857,970, U.S. Pat. No. 3,667,968 and U.S. Pat. No. 3,810,997 have described various enzymatic and biological treatments of vegetable protein compositions.

However, conventional treatment processes have not been fully satisfactory in the provision of bland vegetable protein isolates having dairy-protein like qualities which are particularly suitable for use both as a flavor component and protein source in principally otherwise bland imitation dairy products such as imitation cheese products.

Accordingly, it is an object of the present invention to provide such methods for rapidly treating vegetable protein sources to impart fermented, cheese-compatible flavors to bland vegetable protein isolates, and to provide such modified vegetable protein isolates having altered physical characteristics suitable for use as both a non-dairy protein source and a flavor agent in food products requiring both attributes.

These and other objects will become apparent from the following detailed description and the accompanying drawings of which:

FIG. 1 is a schematic illustration of a process flow chart of process steps of an embodiment of the present invention, and FIG. 2 is a graph illustrating microbial growth characteristics.

Generally in accordance with the present method, aqueous dispersions of bland vegetable protein isolates, such as bland soy protein isolates are heat treated, and subjected to simultaneous partial enzymatic hydrolysis of particular degree and microbial fermentation with specified microorganisms under particular conditions of temperature and limited fermentation time. The fermented vegetable protein isolates are subsequently pasteurized and may be dried such as by spray drying to provide a dried, modified vegetable isolate material having fermented cheese-compatible flavors and improved textural properties.

By combining proteolytic digestion with simultaneous microbial fermentation within a relatively short fermentation time at particular fermentation conditions, following heat treatment of aqueous dispersion of the bland vegetable protein isolate, it is believed that a broad range of desirable flavor compounds can be produced by hydrolysis and fermentation, which are complimentary to each other.

It is also believed that undesirable, bitter flavor components which may be produced by the hydrolysis action of the proteolytic enzymes, may be converted by the microbial organisms under the fermentation conditions to non-bitter components. The short fermentation times utilized have the lower processing and storage costs achieved and, in addition, exogenous microbial contamination can be minimized during batch fermentation procedures.

The use of a bland vegetable protein source is an advantage because background off-flavors from the protein source are disadvantageous to the flavor balance produced by the simultaneous hydrolysis and fermentation processing utilized in the present method.

As indicated, in accordance with the present method, bland vegetable protein isolates are treated to provide the modified vegetable protein isolates of the present invention. The vegetable protein isolates to be subjected to such treatment may be highly soluble vegetable protein isolates having a Nitrogen Solubility Index (NSI) of at least about 70. Particularly preferred are bland soy protein isolates comprising at least about 90 percent by weight, on a dry basis, of vegetable protein, and less than about 1 percent by weight on a dry basis of mono and disaccharides. Such bland vegetable protein isolates may conventionally have inorganic components represented at a level of about 4 percent ash. Such proteins can be fermented and hydrolyzed by the process to achieve fermented, cheese-compatible flavors and improved textural qualities.

The bland protein isolates are processed in the form of an aqueous slurry, and prior to introduction of the proteolytic enzyme component and innoculation of the aqueous vegetable protein isolate slurry with the specified microbial cultures, a moderate heat treatment at a temperature in the range of from about 150° to about 170° F. for about 20 to 40 minutes, or equivalent time-temperature treatment is required in accordance with the method for more effective proteolysis in the presence of enzymes and for initial pasteurization. A heat treatment above 170° F. for an extended period of time appears to cause the final product to be low in solubility and of poor flavor quality. However, high temperature, short time treatment may be used. A high temperature (e.g., 200°–250° F., short time, e.g., 1 to 2 minutes or less) pasteurization after hydrolysis and fermentation does not appear to affect end product quality and effectively inactivates both enzymes and microorganisms prior to spray drying or direct utilization of the heat-treated soy protein isolate slurry.

As indicated, the present method contemplates the use of proteolytic enzymes in the heat-treated aqueous slurry simultaneously with the fermentation treatment. The flavor profile contributed by proteolysis of the vegetable protein isolate is dependent on the degree of hydrolysis produced by the action of the enzyme. Also, acceptable texture and mouthfeel of imitation process cheese products which use the hydrolyzed and fermented vegetable protein are dependent on the degree of protein hydrolysis. The degree of hydrolysis which produces an acceptable product is 3 to 5%, and this generally corresponds to an enzyme to substrate weight ratio of 0.4 to 1.0% (0.004 to 0.01 weight ratio) for the time period and fermentation conditions during which the vegetable protein isolate is subjected to treatment, which may be determined for the particular matter—enzyme system being used.

Commercial food grade neutral proteases selected from the class known as principally endopeptidases are best utilized in the method. Neutral proteases are used because the pH during hydrolysis and fermentation should be in a range of from about 6.5 to about 7.0 during the fermentation step. Depending on the particular protease used, and hence the activity of the protease, the amount of protease which produces satisfactory results will vary within a given range, and may be determined experimentally in order to yield the required degree of hydrolysis. The use of proteases with pH optima much above or below 7.0 should be avoided because acidic or alkaline pH values denature protein and inhibit the microbial metabolism.

As also indicated, specified microbial cultures are also used in accordance with the present invention. Species of the genera Micrococcus and Leuconostoc are required in accordance with the present method. Micrococcus Cohn Subgroup 2 bacteria and *Leuconostoc cremoris* provide an acceptable product. Certain species of Lactobacillus and species of Streptococcus have been evaluated, and have provided a less acceptable fermented product. The preferred microbial innoculum for the method is a pre-packaged frozen cell concentrate of the desired microorganism(s) containing a viable cell count of approximately $1 \times 10^{11}$ cells per milliter. Prior to use, the concentrate is thawed in warm water and added directly to the fermentation vessel.

Alternately prior to their use, the desired microorganisms may be grown on a non-fat dry milk medium, de-fatted soy flour or non-selective nutrient broth. Overnight growth may be used to produce the inoculation cultures and growth temperatures can be in the range of 22°–37° C. For overnight growth methods, the inoculum added to the protein source should best contain at least about $1 \times 10^8$ cells/ml. The overnight culture can be added to the fermentation vessel either directly (when using nonfat dry milk or soy flour), or as a concentrated cell suspension when using a nutrient broth. The amount of concentrate or culture needed in the fermentation should be calculated so that the initial concentration of the desired microorganism(s) in the vegetable protein slurry is in the range of from about $1 \times 10^6$ to about $1 \times 10^7$ cells/ml-slurry.

During fermentation, 37° C. was found to be the optimum for flavor production from the microbial cultures. However, the fermentation may be carried out in the range of from about 30° to about 40° C. Deviation of several degrees below, and especially above, this range have been found to result in inferior product.

In accordance with the method, a limited fermentation time is utilized. The time required for proteolysis of the bland vegetable protein is variable, and an important parameter is the degree of hydrolysis which should be achieved during the fermentation, such that hydrolysis time is kept as short as possible, and kept coextensive with the fermentation time. The minimum fermentation time utilized should be in the range of 120 to 150 minutes, but satisfactory flavor development usually best requires 180 to 240 minutes. Shorter fermentation times do not develop the fullest fermented flavors due to lack of sufficient microbial metabolism.

The vegetable protein possessing fermented, cheese-compatible flavors may be used both as a flavor and protein source in principally otherwise bland imitation process cheese products such as imitation process cheese products. The modified vegetable protein isolate possessing fermented, cheese-compatible flavors may further find use as a partial or complete replacement for milk-derived protein in imitation cheese products.

Turning now to FIG. 1, the present method will be further described with respect to the specific example of process flow diagram there illustrated.

In accordance with the present method, a vegetable protein source such as defatted soy flakes 10 may be treated in accordance with conventional methods to provide a substantially pure, bland soy isolate by removal of substantially all of the nonprotein components of the soy flakes. In this connection, in accordance with conventional practice the soy vegetable protein component of the flakes may be solubilized in water and extracted at a pH of 7.75, with the insoluble material being separated by an appropriate procedure such as filtration or centrifugation. The soluble vegetable protein extract may subsequently be precipitated (i.e., at the isoelectric point of the vegetable protein) with a suitable pH reducing material, such as hydrochloric acid. The preciptated protein may be washed to remove soluble materials and neutralized to a pH of 7.0 by addition of a suitable base such as sodium hydroxide. In the illustrated embodiment, no additional processing aids were used, although it is contemplated that such soy processing aids (e.g., bisulfites) may be used in the purification of the soy protein.

In this manner, an aqueous soy isolate dispersion 12 may be provided containing about 10% by weight solids and 90 weight percent water. Alternatively, the modified dispersion 12 may be spray dried to provide a bland, dried soy isolate containing about 90% by weight vegetable protein, about 4% by weight moisture, about 4% by weight ash, less than about 1% by weight fat and less than about 2% by weight other materials such as carbohydrates or crude fiber, with mono and disaccharide components of the soy isolate being present at a level of generally less than 1% by weight. The spray dried soy isolate material may be reconstituted to form an aqueous soy isolate dispersion 12. The aqueous dispersion 12 is pasteurized, such as by heating to 160° F. for 30 minutes or utilization of high temperature, short time treatment of about 270° F. for 22 seconds. The heat treated dispersion is cooled to 98° F. to provide a pasteurized isolate 14 which may be held in a suitable fermentation vessel. The pasteurized isolate 14, which is substantially devoid of undesired microorganisms, is simultaneously innoculated with a proteolytic Micrococcus organism such as the T-3 microorganism described in U.S. Pat. No. 3,650,768, which is assigned to the assignee of the present invention.

In the illustrated embodiment, about $1 \times 10^{13}$ cells of Micrococcus T-3 microorganism concentrate 16 is combined with 6500 pounds of heat treated soy isolate dispersion 14 to provide a concentration of about $5 \times 10^6$ cells/ml therein. At substantially the same time, neutral food grade proteolytic enzymes 18 are combined with the innoculated isolate 20 at a level of 1.95 pounds each of an enzyme sold under the designation Rhozyme P-11 by Rohm & Haas, and an enzyme sold under the trade designation Prolase RH by G B Fermentation Industries, Inc. The innoculated and enzymatically treated isolate 20 is maintained at a temperature of about 98° F. for a relatively short fermentation time of about 2-4 hours to provide a fermented-hydrolyzed soy isolate slurry 22. The fermented-hydrolyzed isolate slurry may then be subjected to heat treatment and spray drying procedures to produce a dried, modified soy isolate 24. In this connection, the fermented-hydrolyzed isolate 22 may be pasteurized by high temperature, short time treatment at 270° F. for 22 seconds, and may be subsequently spray dried to provide the modified soy isolate 24 having cheese-compatible flavor components, an absence of characteristic "beany" or overly bitter soy flavor components, and texture properties which permit its incorporation into imitation process cheese compositions without producing a mealy or spongy mouth feel. The final heat treatment and drying step may take some additional time depending on the capacity of the pasteurization equipment and the drying equipment, and this should be taken into consideration.

It is believed that the microbial growth on the particular heat treated protein isolate in the presence of proteolytic action is an important feature of the method. In this regard, a series of runs are conducted to evaluate microbial growth of the preferred T-3 microorganism under various conditions. In the first run, 7 pounds of a bland soy protein isolate prepared by extraction at pH 7.75 as previously described are dispersed in 63 pounds of water heated to a temperature of 120°-140° F. for better dispersability. The soy protein isolate is dispersed in water using a large Waring blender and put into a jacketed conical mixer with propeller-type agitator. The slurry is then heated to 160° F. and held at that temperature for 30 minutes in order to pasteurize the slurry and denature the protein to allow for more effective enzyme and microbial action. The heat treated mixture is then cooled to 98° F. for addition of enzymes and cultures. 9.56 grams of neutral proteolytic enzyme (Prolase RH of G B Fermentation Industries, Inc.) and 9.56 grams of proteolytic enzyme (Rhozyme P-11 of Rohm & Haas) are combined with the dispersion, together with about $1 \times 10^{11}$ cells of Micrococcus T-3 as a frozen cell concentrate. The fermentation is carried out for 3 hours, and then the mixture is again pasteurized by heating to 160° F. for 30 minutes, and is subsequently spray dried. The cell concentration is measured at one hour intervals, and the results plotted on FIG. 2.

The fermented material may be spray dried and incorporated at a desired level into an imitation process cheese comprising coconut oil, calcium and sodium caseinates, emulsifiers, stabilizing salts and flavoring agents. For example, spray dried fermented material may be incorporated at a level of up to 50 percent or more (e.g., a 30 percent weight replacement level) on a 1:1 substitution basis for the caseinate component of the imitation process cheese.

Three subsequent runs are carried out which are substantially identical, except that in the second run, one percent glucose, based on the dry weight of the soy protein, is added to the fermentation mixture. In a third run, the one percent glucose is added, but the proteolytic enzyme is omitted. In the fourth run, both the enzyme and glucose are omitted.

As shown in the Figure, the presence of the enzyme appears to enhance the microorganism growth, and the presence of the monosaccharide glucose does not appear to be necessary for effective fermentation.

Accordingly, in view of the present disclosure, it will be appreciated that improved methods and products have been provided in connection with vegetable protein systems.

While the present invention has been particularly described with respect to specific embodiments, it will be appreciated that various modifications and adaptations will become apparent based on the present disclosure, and are intended to be within the spirit and scope of the present invention as set forth in the following claims.

Various of the features of the invention are set forth in the following claims.

What is claimed is:

1. A method for treating vegetable protein isolates to provide improved texture and cheese-compatible flavor properties, comprising
    providing an aqueous slurry of bland vegetable protein isolate comprising less than about 1 percent by weight mono and disaccharides, based on the dry weight of said isolate,
    heat treating said slurry at a temperature in the range of from about 150° F. to about 170° F. for from about 20 to about 40 minutes or equivalent time-temperature treatment to pasteurize and aid in the dispersion of said isolate,
    treating said slurry with neutral food grade proteolytic enzyme selected from the class of endopeptidases at an enzyme to substrate weight ratio in the range of from 0.004 to 0.01 and innoculating said slurry with an effective microorganism selected from the group consisting of Micrococcus Cohn Subgroup 2 and Leuconostoc cremoris to provide an initial concentration of said microorganism in said slurry in the range of from about $1 \times 10^6$ to about $1 \times 10^7$ cells per milliliter of slurry,
    simultaneously fermenting and hydrolyzing said innoculated slurry for from about 2 to about 4 hours at a temperature in the range of from about 30° to about 40° C., and a fermentation pH in the range of from about 6.5 to about 7.0 and
    pasteurizing said slurry to provide a modified vegetable protein isolate.

2. A method in accordance with claim 1 wherein said vegetable protein isolate is substantially pure soy protein isolate, wherein said microorganism is a Micrococcus T-3, wherein said fermentation is carried out in the range of from about 36° to about 38° C., and wherein said pasteurized slurry is spray dried.

3. A method in accordance with claim 1 wherein from about 3 to about 5 percent of the peptide bonds of said protein isolate are hydrolyzed during said fermentation.

4. A modified soy protein product produced by the method of claim 1.

5. A method in accordance with claim 1 wherein said bland vegetable protein source provided as an aqueous slurry has a Nitrogen Solubility Index of at least about 70.

6. A method for treating vegetable protein isolates to provide improved texture and cheese-compatible flavor properties, comprising
   providing an aqueous slurry of bland vegetable protein isolate comprising less than about 1 percent by weight mono and disaccharides, based on the dry weight of said isolate,
   heat treating said slurry at a temperature in the range of from about 150° F. to about 170° F. for from about 20 to about 40 minutes or equivalent time-temperature treatment to pasteurize and aid in the dispersion of said isolate,
   treating said slurry with neutral food grade proteolytic enzyme selected from the class of endopeptidases and innoculating said slurry with a suitable microorganism selected from the group consisting of Micrococcus Cohn Subgroup 2 and Leuconostoc cremoris,
   simultaneously fermenting and hydrolyzing said innoculated slurry for a limited fermention time in the range of from about 2 to about 4 hours at a temperature in the range of from about 30° to about 40° C., and a fermentation pH in the range of from about 6.5 to about 7.0, said proteolytic enzyme being present in effective amount to provide said vegetable protein isolate a degree of hydrolysis in the range of from about 3 to about 5 percent and said microorganism being present in effective cell concentration to impart to said vegetable protein isolate a fermented, cheese-compatible flavor upon said simultaneous fermentation and hydrolysis, and
   pasteurizing said slurry to provide a modified vegetable protein isolate.

* * * * *